United States Patent
Kapoor et al.

(10) Patent No.: US 12,403,936 B2
(45) Date of Patent: Sep. 2, 2025

(54) METHOD FOR CONTROLLING A DRIVER ASSISTANCE SYSTEM DURING OPERATION OF A VEHICLE

(71) Applicant: Volkswagen Aktiengesellschaft, Wolfsburg (DE)

(72) Inventors: Nikhil Kapoor, Wolfsburg (DE); Jan David Schneider, Wolfsburg (DE); Serin Varghese, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 259 days.

(21) Appl. No.: 18/043,449

(22) PCT Filed: Jul. 6, 2021

(86) PCT No.: PCT/EP2021/068721
§ 371 (c)(1),
(2) Date: Feb. 28, 2023

(87) PCT Pub. No.: WO2022/048812
PCT Pub. Date: Mar. 10, 2022

(65) Prior Publication Data
US 2023/0331254 A1    Oct. 19, 2023

(30) Foreign Application Priority Data
Sep. 2, 2020 (DE) ............... 10 2020 211 097.2

(51) Int. Cl.
*B60W 60/00* (2020.01)
*B60W 50/00* (2006.01)
(Continued)

(52) U.S. Cl.
CPC .... *B60W 60/0015* (2020.02); *B60W 50/0098* (2013.01); *B60W 50/14* (2013.01);
(Continued)

(58) Field of Classification Search
CPC ....................................................... G06F 21/56
See application file for complete search history.

(56) References Cited

U.S. PATENT DOCUMENTS 10,726,134 B2   7/2020  Wang et al.
11,106,893 B1 * 8/2021  Zhu .......................... B60T 8/00
(Continued)

FOREIGN PATENT DOCUMENTS

WO    2022/048812 A1    3/2022

OTHER PUBLICATIONS

"Zifan Wang", "Yilin Yang", "Ankit Shrivastava", "Varun Rawal,", "Zihan Ding", "Towards Frequency-Based Explanation for Robust CNN" "May 6, 2020" pp. 1-7 (Year: 2020).*

(Continued)

*Primary Examiner* — Darshan I Dhruv
(74) *Attorney, Agent, or Firm* — Slayden Grubert Beard PLLC

(57) ABSTRACT

The disclosure relates to a method for controlling a driver assistance system during operation of a, especially partially automated, fully automated or autonomous, vehicle, wherein the driver assistance system comprises: a, for example at least one, sensor for observing an environment of the vehicle and an electronic control unit using a, especially at least one, neural network for analyzing sensor data of the sensor and providing perception tasks based on the analyzed sensor data, the method comprising:

providing a data set of the sensor data by the sensor) in a spatial domain;

transforming the data set of the sensor data by the electronic control unit using frequency analysis into a frequency spectrum in a frequency domain; and (Continued)

analyzing the frequency spectrum of the data set in order to detect an adversarially attacked data set, for example before analyzing the sensor data for providing perception tasks.

17 Claims, 2 Drawing Sheets

(51) Int. Cl.
  *B60W 50/14* (2020.01)
  *G06F 18/2131* (2023.01)
  *G06F 21/56* (2013.01)
  *G06N 3/08* (2023.01)

(52) U.S. Cl.
  CPC ..... *B60W 60/0053* (2020.02); *G06F 18/2131* (2023.01); *G06F 21/56* (2013.01); *B60W 2420/403* (2013.01); *B60W 2420/408* (2024.01); *G06N 3/08* (2013.01)

(56) References Cited

U.S. PATENT DOCUMENTS

| | | | |
|---|---|---|---|
| 2019/0187718 A1* | 6/2019 | Zou | G05D 1/0231 |
| 2021/0026958 A1* | 1/2021 | Filipek | G06F 21/56 |
| 2021/0064980 A1* | 3/2021 | Heinrich | G06V 10/82 |
| 2021/0156960 A1* | 5/2021 | Popov | G01S 13/5242 |
| 2022/0126863 A1* | 4/2022 | Moustafa | G06N 20/00 |
| 2022/0157165 A1* | 5/2022 | Dantrey | H04R 3/005 |
| 2022/0301282 A1* | 9/2022 | Witt | G06V 10/762 |
| 2023/0213610 A1* | 7/2023 | Eberspach | G06V 40/166 |

OTHER PUBLICATIONS

"Fei Guo", "Zichang Wang", "Suguo Du", "Huaxin Li", "Haojin Zhu", "Detecting Vehicle Anomaly in the Edge via Sensor Consistency and Frequency Characteristic" vol. 68, No. 6, 5618-5628 (Year: 2019).*

"Zifan Wang", "Yilin Yasng", "Ankit Srivastava", "Varun Rawal", "Zihao Ding". "Towards Frequency-Based Explanation for Robust CNN" (Year: 2020).*

Smith, S.W. et al., "Chapter 17: Custom Filters," The Scientist and Engineer's Guide to Digital Signal Processing, URL: http://www.dspguide.com/CH17.PDF, 14 pages, 1997.

Reschka, Andreas et al., "A Surveillance and Safety System based on Performance Criteria and Functional Degradation for an Autonomous Vehicle," International IEEE Conference on Intelligent Transportation Systems, pp. 237-242, Sep. 16, 2012.

Meng, Dongyu et al., "MagNet: a Two-Pronged Defense against Adversarial Examples," arXiv:1705.09064v2, CCS '17, 13 pages, Oct. 30, 2017.

Xu, Weilan et al., "Feature Squeezing: Detecting Adversarial Examples in Deep Neural Networks," Network and Distributed Systems Security Symposium (NDSS), arXiv:1704.01155v2, 15 pages, Dec. 5, 2017.

Fujiyoshi, Hirnobu et al., "Deep Learning-Based Image Recognition of Autonomous Driving," IATSS Research 43, pp. 244-252, Dec. 6, 2019.

Vacanti, Giovanni et al., "Adversarial Detection and Correction by Matching Prediction Distributions," arXiv:2002.09364v1, 13 pages, Feb. 21, 2020.

Frank, Joel et al., "Leveraging Frequency Analysis for Deep Fake Image Recognition," arXiv:200308685v, International Conference on Machine Learning, PMLR, URL: https://arxiv.org/pdf/2003.08685v1.pdf, pp. 3247-3258, Mar. 19, 2020.

Wang, Zifan et al., "Towards Frequency-Based Explanation for Robust CNN," arXiv:2005.03141v1, 7 pages, May 6, 2020.

Wintel, Florian et al., "Selected Topics in Deep Learning #1: Adversarial Attacks—Tutorial: Adversarial Examples Against Image Recognition," Institute for Applied AI, URL: https://ai.hdm-stuttgart.de/news/2020/selected-topics-1-adversarial-attacks/, 12 pages, Sep. 1, 2020.

German Office Action, Application No. 102020211097.2, 7 pages, Jul. 15, 2021.

International Search Report and Written Opinion, Application No. PCT/EP2021/068721, 14 pages, Oct. 22, 2021.

* cited by examiner

METHOD FOR CONTROLLING A DRIVER ASSISTANCE SYSTEM DURING OPERATION OF A VEHICLE

CROSS-REFERENCE TO RELATED APPLICATIONS

This application claims priority to German Patent Application No. DE 10 2020 211 097.2, filed on Sep. 2, 2020 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The invention is related to a method for controlling a driver assistance system during operation of a, for example partially automated, fully automated or autonomous, vehicle according to the independent method claim. Further, the invention is related to an electronic control unit according to the independent device claim. Furthermore, the invention is related to a vehicle comprising a corresponding electronic control unit according to the second independent device claim. Moreover, the invention is related to a computer program product for a corresponding method according to the independent product claim.

Modern driver assistance systems, used for partial- or fully automated driving, commonly use machine learning to assess the vehicle surroundings, including objects, pedestrians and other vehicles. Using deep neural networks, different types of sensor data (camera, radar, lidar) can be processed to produce a world model of the surrounding environment. As part of the perception chain, neural networks are used for different tasks such as semantic segmentation or object detection. For semantic segmentation, the neural network outputs a pixel-wise labelling of the input images according to a pre-defined set of class labels, while networks for object detection render bounding boxes around the objects of defined target classes. In both cases, state-of-the-art neural networks can be for example convolutional neural networks which parameterize a number of weights during training with respect to the input using ground truth data. Using gradient based optimization, the parameters can be tuned and the underlying function is optimized such that the loss quantified by a loss function is minimized. In an iterative training process, the neural network learns a function representing the mapping from the input to output data. State-of-the-art models may consist of various layers with high numbers of filters, typically resulting in a very large number of trainable parameters and thus learn a complex high-dimensional underlying function. While neural networks outperform classical computer vision approaches for image processing, the neural networks come with a number of challenges. This includes that most neural networks are susceptible to so-called adversarial attacks. Adversarial attacks refer to the application of hand-crafted noise to input images. However, in contrast to random perturbations, this noise is optimized towards a misclassification of the input by the neural networks. This way, the addition of the adversarial perturbation to the input leads to a drastic drop in accuracy of the neural network. Depending on various factors, the adversarial attack can potentially lead to malfunction of the neural network and thus, as a consequence, impact the perception capabilities of the automated driving function.

Since the reliable perception of the environment is safety-critical for automated driving, malfunction of the neural networks may endanger the safety of the automated vehicle.

Some known solutions are based on hardening neural networks against adversarial attacks. However, such solutions need a lot of computational power. Since self-driving systems requires real-time applications, the hardened neural networks are not practicably in the self-driving systems.

Also, adversarial attack detectors are known, such as feature squeezing (Feature Squeezing: Detecting Adversarial Examples in Deep Neural Networks, Weilin Xu, David Evans, Yanjun Qi University of Virginia evadeML.org, In Network and Distributed Systems Security Symposium (NDSS) 2018, San Diego, February 2018). However, the feature squeezing techniques do not work under strong attacks.

Coming up with reliable and effective adversarial detectors that work across a range of noise types and strengths is still considered an unsolved problem. In summary, most of the current solutions do not scale to different attacks and their proposed improvements are only marginal.

SUMMARY

A need exists to provide a method for controlling a driver assistance system during operation of a vehicle with improved accuracy and increased safety. The need is addressed by the subject matter of the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for controlling a driver assistance system of a vehicle is provided, which enables detection of adversarial attacks with different attack types, also works well on clean images, which enables detection of adversarial attacks with different attack strengths, and which is computationally cheap. Also, in some embodiments, a corresponding electronic control unit for the vehicle, a corresponding vehicle, and a related computer program product are provided.

According to a first example aspect, a method for controlling a driver assistance system during operation of a, especially partially automated, fully automated or autonomous, vehicle is provided with the features of the independent method claim. According to a second example aspect, an electronic control unit with the features of the independent device claim is provided. According to a third example aspect, a vehicle comprising a corresponding electronic control unit with the features of the second independent device claim is provided. According to a fourth example aspect, a computer program product for a corresponding method with the features of the independent product claim is provided. Details and features disclosed with respect individual aspects also apply to the other aspects and vice versa.

According to another example aspect, a method for controlling a, especially at least one, driver assistance system during operation of a, especially partially automated, fully automated or autonomous, vehicle, is provided wherein the driver assistance system comprises: a, for example at least one or more, sensor(s) for observing an environment of the vehicle and an electronic control unit using a, especially at least one or more, neural network(s) for analyzing sensor data of the sensor and providing perception tasks based on the analyzed sensor data, the method comprising the following steps:

1) providing a data set of the sensor data by the sensor in a spatial domain,
2) transforming the data set of the sensor data by the electronic control unit using frequency analysis into a frequency spectrum in a frequency domain,
3) analyzing the frequency spectrum of the data set in order to detect an adversarially attacked data set (or in other words to verify the data set (B) as an adversarially attacked data set or as a clean data set), for example before analyzing the sensor data for providing perception tasks for the vehicle.

The steps of the method can be carried out in the given order or in a modified order. The steps of the method can be carried out simultaneously and/or repeatedly to allow a flowing process.

For each driver assistance system of the vehicle the method can be carried out separately.

The driver assistance systems are electronic systems that relieve and/or assist drivers by driving and parking functions of the vehicle at least partly or completely. The driver assistance systems use sensors, lidars, radars and/or cameras, providing perception tasks, for example to detect nearby obstacles or driver errors, and respond accordingly. For this aim, the sensors, lidars, radars and/or cameras serve to produce a world model of the surrounding environment of the vehicle. Thus, the driver assistance systems are used for safety and better driving. Safety features serve for example to avoid accidents and collisions. The driver assistance systems provide for example automate lighting, adaptive cruise control, assist in avoiding collisions, incorporate traffic warnings, alert drivers to possible obstacles, assist in lane departure and lane centering, provide navigational assistance and so on.

The driver assistance systems use machine learning (based on neural networks) to assess the vehicle surroundings, including objects, pedestrians and other vehicles. Using neural networks, such as deep neural networks, different types of sensor data (camera, radar, lidar) can be processed to produce a world model of the surrounding environment of the vehicle. As part of the perception chain, neural networks are used for different tasks such as semantic segmentation or object detection.

The sensor data can be optical, acoustical and/or electromagnetic data. The data sets can be provided, for example, as pictures of the environment of the vehicle. The data sets can also be called input images within the context of the present discussion. To provide the input images, sensor data of different sensors can be used.

The frequency analysis can be used to receive a, especially discrete, spectrum of frequencies, that is frequency spectrum of the data set (or with other words of the input image). The techniques of the frequency analysis can be for example discrete Fourier transformation, a discrete cosine transformation and/or Wavelet transformation.

An idea is to perform a frequency analysis of the input images, before the input images are given to the neural network for processing in order to analyze sensor data of the sensor and to provide perception tasks for the vehicle based on the analyzed sensor data. Using frequency analysis, for example a discrete Fourier transformation, the input images will be transformed to the frequency spectrum in the frequency domain (also called frequency space).

The inventors have recognized that adversarial attacks lead to notable changes in the frequency spectrum. The frequency space analysis can be used for detecting adversarial attacks present in the data sets. Based on whether or not an adversarial attack is detected in the input images using the detection mechanisms, counter-measures can be provided to increase the safety of the driver assistance system during operation of a, especially partially automated, fully automated or autonomous, vehicle.

The data set is (before being processed by the neural network for operating of the vehicle) being transformed to the frequency space using for example a discrete Fourier transformation (DFT). Using such transformation, the input image can be visualized in the frequency space by its frequency spectrum. The data sets (such as input images) often consist of many points, indicating low frequency and high frequency points along different directions of the input image. Unlike in the spatial domain, where the adversarially attacked images look quite similar to their clean counterparts, these images look quite different in the frequency domain. One of the reasons for this is that an adversarial attack consists of computing an adversarial noise by repeatedly passing (usually linear) noise across the target neural network to solve an iterative gradient based optimization problem. The repeated forward and backward passes are subject to various kinds of sub-sampling and upsampling layers (typically used in a neural network), which lead to noticeable artifacts, which can be observable in the frequency domain as (usually linear) noise. Since every adversarial image has adversarial noise added on top, these adversarial images tend to have visibly different frequency spectrums from their clean counterparts. Based on this finding, different kinds of detectors are provided, that capture precisely the patterns in the frequency domain indicative for adversarial noise and can denoise them systematically for the purposes of the driver assistance system.

Thus, an idea is to utilize the described analysis of frequency space to derive detection mechanisms for adversarial attacks.

Thus, some embodiments provide a method for controlling a driver assistance system during operation of a, especially partially automated, fully automated or autonomous, vehicle with improved accuracy and increased safety. The embodiments are suitable for detecting of multiple attack types, will also works well on clean images, which further scales across different attack strengths, and which is computationally very cheap.

Further, some embodiments may provide by a method for controlling a driver assistance system during operation of a vehicle that the method steps 1) to 3) are executed before analyzing the sensor data for providing perception tasks for the vehicle. Thus, it can be ensured that only true, non-manipulated data sets will be processed to analyze sensor data of the sensor and to provide perception tasks for the vehicle. In this way, safety during operation of the vehicle can be drastically increased. If a data set is identified as an adversarially attacked data set, it will not be processed or it can be cleaned-up for further processing or addressed to a special hardened neural network for analyzing.

Furthermore, some embodiments may provide by a method for controlling a driver assistance system during operation of a vehicle that the method steps 1) to 3) are executed periodically. In such a way, an uninterrupted security mechanism against adversarial attacks can be provided.

Moreover, some embodiments may provide by a method for controlling a driver assistance system during operation of a vehicle that the method steps 1) to 3) are executed for each data set of the sensor data during operation of the vehicle. Thus, reliable operation of the driver assistance system can be provided.

Beneficially, the sensor data can comprise camera, lidar and/or radar data. Also, it is possible that the data set can be provided as a picture of the environment of the vehicle. In this manner, intuitive and understandable control mechanism can be provided for the driver assistance system.

Within the context of this discussion, it can be possible that an electronic control unit uses a deep neural network as the neural network for analyzing the sensor data of the sensor and for providing perception tasks for the vehicle based on the analyzed sensor data. Deep neural networks can be used for automated driving functions provided by the driver assistance system during operation of the vehicle, for example for creating an environment model of the vehicle.

Besides of this, some embodiments may provide by a method for controlling a driver assistance system during operation of a vehicle that the frequency analysis in step 2) is provided by a discrete Fourier transformation, a discrete cosine transformation and/or Wavelet transformation. Such transformations are proven, easy and computationally cheap technologies to achieve a frequency spectrum of the data set in the frequency space. Providing the frequency spectrum of the data set in the frequency space is much easier, faster and cheaper than hardening of known neural networks. This is beneficial since the self-driving system requires real-time applications on embedded hardware with limited computing capabilities.

Apart from that, some embodiments may provide by a method for controlling a driver assistance system during operation of a vehicle that for detecting the adversarially attacked data set in step 3) the neural network is used, which is also used for analyzing the sensor data of the sensor and for providing perception tasks for the vehicle, and/or for detecting the adversarially attacked data set in step 3) a special detecting neural network is used. Flexible using of the same neural network and/or the special detecting neural network can be beneficial in order to adapt the driver assistance system to customer requirements and embedded hardware conditions in the vehicle. Using multiple neural networks (with different architectures) in an ensemble to validate the driver assistance system output can be beneficial for reliable detection of the adversarially attacked data sets among data sets provided by the sensor.

In addition, some embodiments may provide by a method for controlling a driver assistance system during operation of a vehicle that the neural network and/or the special detecting neural network used for detecting the adversarially attacked data set will be trained in the frequency domain on frequency spectrums of clean data sets and on frequency spectrums of prepared adversarially attacked data sets, especially using different kinds of adversarial attacks, in order to learn differences between the frequency spectrums of the clean data sets and the frequency spectrums of the adversarially attacked data sets in the frequency domain. In this way, the neural network and/or the special detecting neural network can learn the differences in the frequency space between clean and adversarially attacked images over plurality of possible adversarially attacks. Training the neural network and/or the special detecting neural network for detection the adversarially attacked data sets in the frequency domain could not only lead to a detection of the attack as such, but also reveal the type of the attack. Therefore, a secondary, hardened neural network can be found which is known to be robust against this special adversarial attack that is present in the specific case to analyze the data sets in an improved manner.

Further, some embodiments may provide by a method for controlling a driver assistance system during operation of a vehicle that for detecting the adversarially attacked data set in step 3) a denoising filter, especially a Wiener filter, is used for denoising the frequency spectrum of the data set in the frequency domain, wherein for example the denoising filter is built in the frequency domain using frequency spectrums of clean data sets and noise spectrums of prepared adversarially attacked data sets, for example using different kinds of adversarial attacks. The Wiener filter can be derived in a statistical fashion by estimating signal-to-noise-ratios between the frequency spectrums of the attacked images and their clean counterparts. These estimated signal-to-noise-ratios can then be used to denoise the frequency spectrums of the input images from the adversarial frequencies in the frequency domain, especially in a multiplicative manner. Since, the denoising filter only suppress adversarial frequencies, it does not modify clean images that significantly, as these images are devoid of adversarial frequencies in the first place. Thus, the derived denoising filter can also be applied to any clean or attacked image. In this way, the frequency spectrums of the clean data sets can be easily distinguished from the frequency spectrums of the manipulated data sets. The comparison between the frequency spectrums (achieved in step 2) and the denoised frequency spectrums (denoised with the help of the denoising filter) can be made in the frequency domain, since the frequency spectrums shows the modifications in the frequency domain more clearly as the data sets in the spatial domain. However, the comparison between the data sets and cleaned-up data sets can also be made in the spatial domain. An inverse transformation of the denoised frequency spectrums can be used to convert the denoised frequency spectrums back to the spatial domain, thus achieving the cleaned-up data sets.

Furthermore, some embodiments may provide by a method for controlling a driver assistance system during operation of a vehicle that for detecting the adversarially attacked data set in step 3)

the frequency spectrum of the data set will be compared with a denoised frequency spectrum (for example denoised with the help of the denoising filter), wherein especially a threshold will be applied by comparing the frequency spectrum of the data set with the denoised frequency spectrum, wherein for example the attacked data sets will be detected if a difference between the frequency spectrum of the data set and the denoised frequency spectrum is greater than the applied threshold. More specifically, the method can compute metrics such as structural similarity index measure and/or mean squared error for the frequency spectrums of the data sets and for the frequency spectrums of the denoised data sets and apply a suitable, knowingly defined, threshold on these values. Since, the attacked images are changed more drastically compared to the clean images in the frequency space as in the spatial domain, they lead to a greater SSIM increase, and/or a correspondingly to a greater MSE decrease due to denoising, when compared to the input images. Thus, the adversarially attacked data sets can be easily recognized in an easy way and with little computing power.

Moreover, some embodiments may provide by a method for controlling a driver assistance system during operation of a vehicle that if in step 3) an adversarially attacked data set is detected (or in other words the data set (B) is identified as an adversarially attacked data set), at least one following step is provided:
  4) initiating an emergency maneuver.

Thus, the safety during the operation of the vehicle can be increased in a drastic but also in an easy way.

The emergency maneuver can comprise at least one of the following measures:
  reducing vehicle speed,
  initiating an emergency stop,
  providing an alarm inside and/or outside of the vehicle,
  activating a manual driving mode, and/or
  deactivate the driver assistance system.

Thus, accidents during the operation of the vehicle can be easily avoided.

Besides of this, some embodiments may provide by a method for controlling a driver assistance system during operation of a vehicle that if in step 3) an adversarially attacked data set is detected (or in other words the data set is identified as an adversarially attacked data set, at least one following step is provided:
  5) activating a security mechanism against an adversarial attack.

Thus, the manipulated data sets can not only be recognized but also cleaned-up for further processing.

The security mechanism against an adversarial attack can comprise at least one of the following measures:
  activating a pre-processing technique to remove adversarial attack from the data set,
  using a denoising filter for cleaning the adversarially attacked data set,
  using a hardened neural network for analyzing the adversarially attacked data set,
  using multiple other neural networks with different architectures in an ensemble and performing a consolidation of their output for analyzing the adversarially attacked data set,
  applying rule-based technique for analyzing the adversarially attacked data set, i.e., using external, human-readable devices,
  requesting a user of the vehicle for analyzing the adversarially attacked data set.

Thus, even adversarially attacked data sets can be easily cleaned-up.

According to another example aspect, an electronic control unit is provided, comprising: a memory, in which a program code is stored, and a computing unit, wherein when carrying out the program code by the computing unit, a method is performed as described above. With the help of the electronic control unit the same benefits can be achieved as with the help of the method described above. Full reference is made to these benefits in the present case.

Another example aspect provides a vehicle comprising a corresponding electronic control unit. With the help of the vehicle, the same benefits can be achieved as with the help of the method described above. Full reference is made to these benefits in the present case.

Another example aspect provides a computer program product comprising a program code for carrying out a method as described above. With the help of the computer program product the same benefits can be achieved as with the help of the method described above. Full reference is made to these benefits in the present case.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

Figure 1:
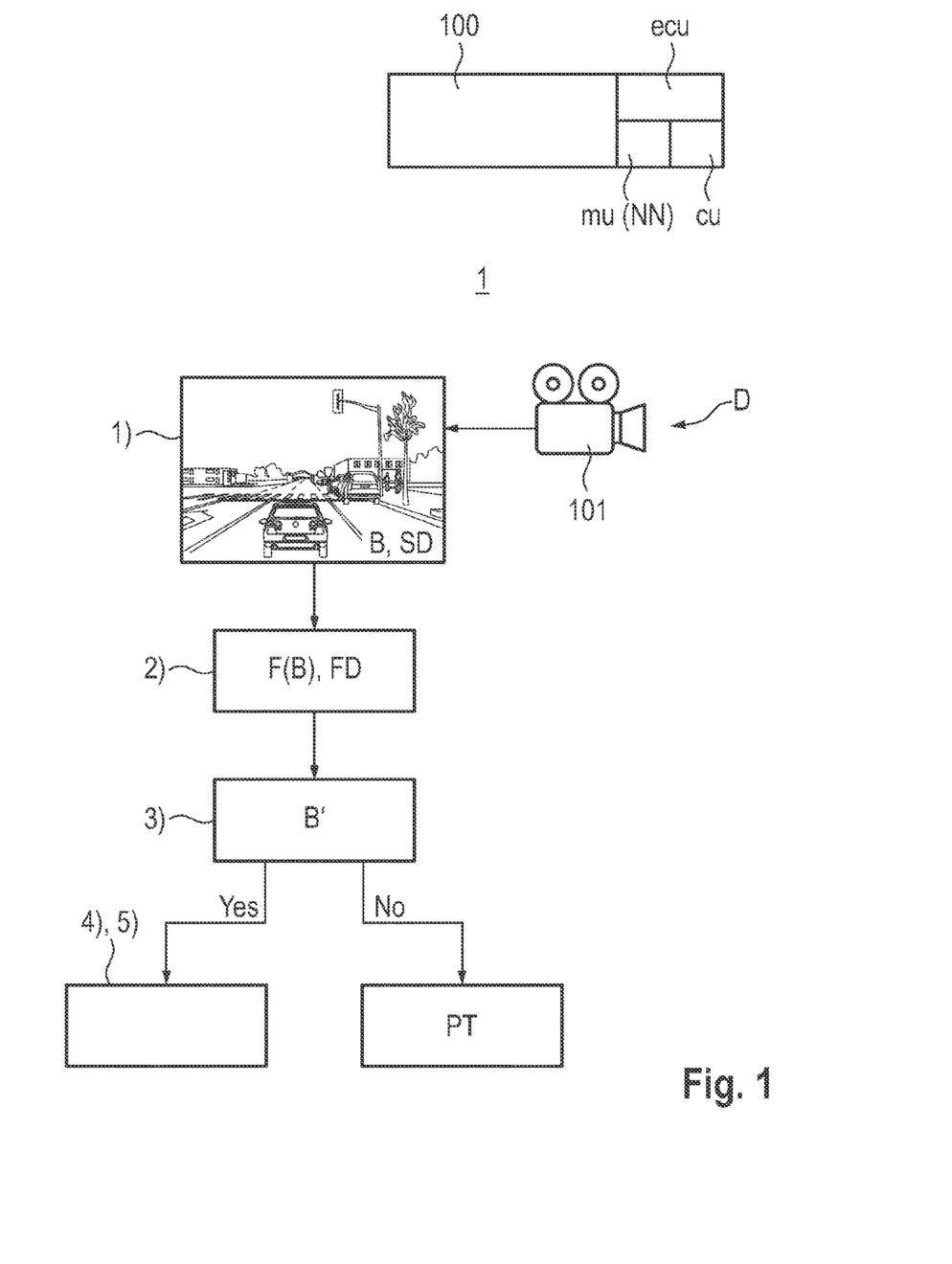
FIG. 1 shows a schematic diagram of embodiments of a method.

FIG. 1 shows a schematic diagram for explanation of a method according embodiments. The method serves for controlling a driver assistance system 100 during operation of a, especially partially automated, fully automated or autonomous, vehicle 1 in order to prevent processing of adversarially attacked data during operating the vehicle, which can lead to malfunction of the driver assistance system 100 and crucial safety problems in the vehicle 1.

The driver assistance system 100 can comprise following elements: a, especially at least one or more, sensor 101 for observing an environment of the vehicle 1 and an electronic control unit ecu using a, for example at least one, neural network NN (for example a deep neural network DNN) for analyzing sensor data D of the sensor 101 and providing perception tasks PT for the vehicle 1 based on the analyzed sensor data D.

As FIG. 1 shows, the method comprising the following steps:
  1) providing a data set B of the sensor data D by the sensor 101 in a spatial domain SD, for example in form of a picture of the environment of the vehicle (1), also called an input image,
  2) transforming the data set B of the sensor data D by the electronic control unit ecu using frequency analysis into a frequency spectrum F(B) in a frequency domain FD,
  3) analyzing the frequency spectrum F(B) of the data set B in order to detect an adversarially attacked data set B' (or in other words to identify the date set B as an adversarially attacked data set B' or as a clean data set B), especially before analyzing the sensor data D for providing perception tasks PT for the vehicle 1.

Beneficially, the steps of the method can be carried out simultaneously and/or repeatedly to allow a flowing process for subsequent obtained data sets B by the sensor 101.

The driver assistance systems 100 can serve for automated lighting, adaptive cruise control, assist in avoiding collisions, incorporate satnav/traffic warnings, alert drivers to possible obstacles, assist in lane departure and lane centering and/or provide navigational assistance.

The driver assistance systems 100 can be used for partial- or fully automated driving. The driver assistance systems 100 can use machine learning (based on neural networks NN) to capture the vehicle surroundings, including objects, pedestrians and other vehicles.

The driver assistance systems 100 can use different types of sensor data (camera, radar, lidar) which can be processed by neural networks NN in order to produce an environment model of the vehicle surrounding. The neural networks NN can be for example used for different tasks such as semantic segmentation or object detection.

The sensor 101 data can detect optical, acoustical and/or electromagnetic waves. The data sets B can be provided as input images, using sensor data D of one or more sensors 101.

The FIG. 1 shows schematically a sensor 101 in the form of a camera. The data set B in this case is a picture of the environment of the vehicle 1. The whole vehicle 1 is not shown in the FIGS. only on the grounds of simplicity.

The frequency analysis can be used to receive a discrete spectrum of frequencies, that is frequency spectrum F(B) of the input image. The techniques of the frequency analysis can be ,for example, discrete Fourier transformation DFT (more specifically 3D discrete Fourier transformation DFT), a discrete cosine transformation, Wavelet transformation and so on.

The frequency analysis of the input images can be for example executed before the input images are given to the neural network NN for processing the sensor data D.

The data set B being transformed to the frequency space using, for example, a discrete Fourier transformation DFT can be visualized in the frequency space by its frequency spectrum F(B). The data sets B (such as input images) often consist of many points, indicating low frequency and high frequency points along different directions of the input image.

Whereas the adversarially attacked data sets B' look quite similar to their clean counterparts in the spatial domain SD, the frequency spectrums F(B') of adversarially attacked data sets B' look quite different in the frequency domain FD comparing to the denoised frequency spectrums F*(B). This is because an adversarial attack uses an adversarial noise N (usually like linear noise in signal processing) which can pass across the target neural network without strong changes in the data set in the spatial domain SD. The adversarial noise N passes different layers typically used in the neural network, but lead to noticeable artifacts in the frequency domain FD. Since, every adversarial image has the adversarial noise N added on top, these adversarial images tend to have visibly different frequency spectrums F(B') from their clean counterparts F(B). Based on this finding, the method provides in step 3) different approaches or different kinds of detectors, that can precisely recognize the patterns in the frequency domain FD indicative of adversarial noise N.

Figure 2:
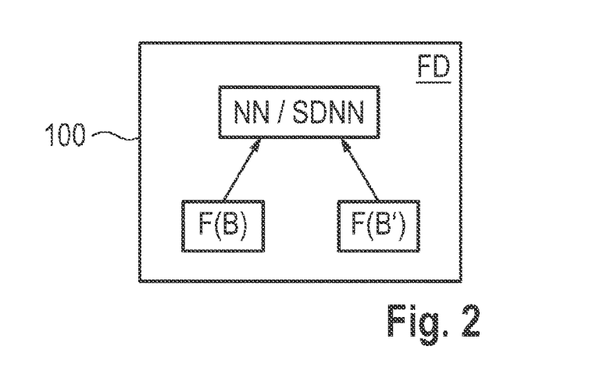
FIG. 2 shows a schematic diagram of embodiments of training of neural networks, wherein the training is used to learn differences of frequency spectrums of clean data sets and frequency spectrums of adversarially attacked data sets in a frequency space.
Figure 3:
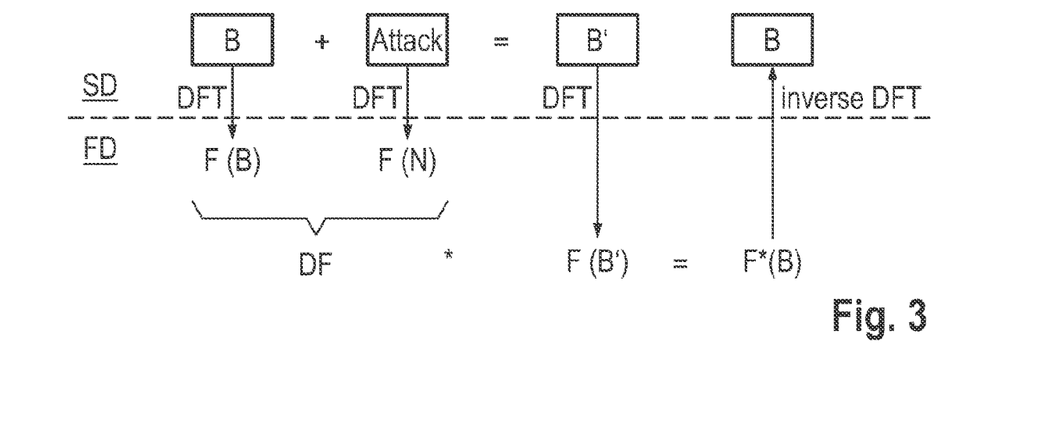
FIG. 3 shows a schematic diagram of how to build and how to use a denoising filter according to embodiments.

Possible approaches for detection the adversarially attacked data sets B' in step 3) can include the following kinds of detectors, using the frequency spectrum F(B) of the data sets B shown in FIGS. 2 and 3:

First detector is shown schematically in FIG. 2. The first detector provides: training a special detecting neural network SDNN (or even the same neural network NN, which is also used for providing perception tasks PT for the vehicle 1, if possible) for classification on clean data sets B and adversarially attacked data sets B' using different kinds of adversarial attacks (all in the frequency domain FD). In this way, the network SDNN or NN can learn the differences $\Delta(F(B), F(B'))$ in frequency space of frequency spectrums F(B), F(B') of clean and adversarially attacked images. The clean and adversarially attacked images are represented in the frequency domain FD by its frequency spectrums F(B), F(B').

Second detector is shown schematically in FIG. 3. The second detector provides: deriving a denoising filter DF, such as a Wiener filter, based on the adversarial noise N in the frequency domain FD using different kinds of adversarial attacks. The Wiener filter can also be used as a denoising filter DF for denoising images in the frequency domain of linear additive noise (see also FIG. 1, especially step 5)). Such a filter can also be adapted for the adversarial attack problem. The denoising filter DF, such as the Wiener filter, can be derived in a statistical fashion by estimating the signal-to-noise-ratios for the attacked data sets B' from their clean counterparts B:

$$DF = \frac{|F(B)|^2}{|F(B)|^2 + |F(N)|^2}.$$

N represents the adversarial noise N. These estimated signal-to-noise-ratios can then be used to denoise input images from the adversarial frequencies in a multiplicative manner in the frequency domain FD:

$$DF*F(B')=F*(B).$$

An inverse transformation (inverse DFT) of a denoised frequency spectrum F*(B) can then be used to convert the denoised frequency spectrum F*(B) back to the spatial domain SD. Thus, a cleaned-up data set B can be received.

Since the denoising filter DF only suppresses adversarial frequencies, they do not modify clean images significantly, as these images are devoid of adversarial frequencies in the first place. As FIG. 4 shows, the derived denoising filter DF can then be applied to any clean data set B or attacked data set B'.

Figure 4:
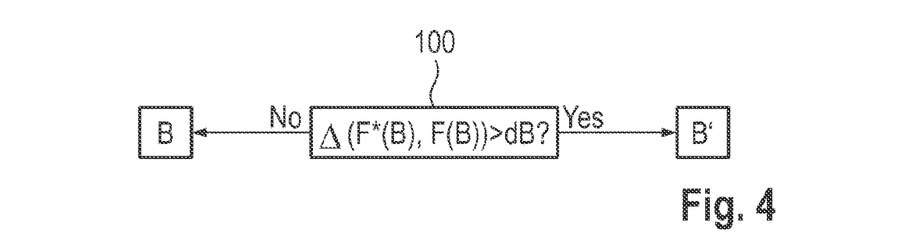
FIG. 4 a schematic threshold according to embodiments.

Further, the FIG. 4 shows that a threshold dB on a difference $\Delta(F(B), F*(B))$ between the frequency spectrum F(B) of the data sets B and the denoised frequency spectrum F*(B) can be used as an adversarial attack detector.

More specifically, the method can compute metrics such as structural similarity index measure (SSIM) and/or mean squared error (MSE) on the frequency spectrums F(B) of the data sets B and the denoised frequency spectrums F*(B) and apply corresponding thresholds on these values. Since, the attacked images are changed more drastically compared to the clean images, they lead to a greater SSIM increase, and a correspondingly to a greater MSE decrease due to denoising, when compared to clean images.

Using any of the detectors according to FIG. 2 or FIG. 3 (or potentially other approaches based on frequency space analysis), the teachings provide a method to detect adversarial attacks of the input images. As FIG. 1 shows, the method can then be applied before (in a pre-processing step) the neural network NN is used for building the environment model of the vehicle 1 (that is to provide perception tasks PT).

If in step 3) an adversarially attacked date set B' is detected, the driver assistance system 100 can execute a number of follow-up safety mechanisms:

4) initiating an emergency maneuver, and/or
5) activating a security mechanism against an adversarial attack.

The emergency maneuver in step 4) can comprise at least one of the following measures:
reducing vehicle speed, initiating an emergency stop,
providing an alarm inside and/or outside of the vehicle 1,
activating a manual driving mode, and/or
deactivate the driver assistance system 100.

The security mechanism in step 5) against an adversarial attack can comprise at least one of the following measures:
activating a pre-processing technique to remove adversarial attack from the data set B,
using a denoising filter DF for denoising the adversarially attacked data set B',
using a hardened neural network for analyzing the adversarially attacked data set B',
using multiple other neural networks with different architectures in an ensemble and performing a consolidation of their output for analyzing the adversarially attacked data set B',
applying rule-based technique for analyzing the adversarially attacked data set B', i.e., using external, human-readable devices,
requesting a user of the vehicle for analyzing the adversarially attacked data set B'.

The discussed method scales to multiple attack types as every attack performs a kind of an iterative gradient based noise processing (both forward and backward passes), which leads to detectable patterns in the frequency domain captured precisely by the Wiener filters or the neural network used for detection.

The discussed method will also work well on clean images, as Wiener filters by design would not modify the clean images as such, as clean images (in the frequency domain) are devoid of adversarial frequencies. Thus, if even the Wiener filter is used instead of first detector, the clean images are left unchanged and there is no negative impact of both detectors.

The discussed method also scales across different attack strengths, as the strength of the noise in the spatial domain does not modify patterns in the frequency domain.

The discussed method offers practical usage, as only a single attack filter would work well across different attack types, hence it is computationally cheap.

An electronic control unit ecu comprising: a memory unit mu, in which a program code is stored, and a computing unit cu, wherein when carrying out the program code by the computing unit cu, a method is performed as described above, provides another example aspect. In other words, the electronic control unit ecu is configured in such a way to execute the method as described above.

The vehicle 10 comprising a corresponding electronic control unit ecu provides another example aspect.

Also, a computer program product comprising a program code for carrying out a method as described above provides another example aspect.

The above description of the FIGS. describes the present invention only in the context of examples. Of course, individual features of the embodiments can be combined with each other, provided it is technically reasonable, without leaving the scope of the invention.

LIST OF REFERENCE NUMERALS 100 driver assistance system
101 sensor
1 vehicle
ecu electronic control unit
cu computing unit
mu memory unit
D sensor data
PT perception tasks
B data set
B' adversarially attacked data set
SD spatial domain
FD frequency domain
F(B) frequency spectrum
F(B') frequency spectrum
F*(B) denoised frequency spectrum
Δ difference
DF denoising filter
dB threshold
SSIM structural similarity index measure
N adversarial noise
NN neural network
DNN deep neural network
SDNN special detecting neural network
DFT discrete Fourier transformation
Inverse DFT inverse discrete Fourier transformation.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit or device may fulfill the functions of several items recited in the claims.

The term "exemplary" used throughout the specification means "serving as an example, instance, or exemplification" and does not mean "preferred" or "having advantages" over other embodiments. The terms "in particular", "particularly", and "especially" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for controlling a driver assistance system during operation of a vehicle, wherein the driver assistance system comprises at least one sensor for observing an environment of the vehicle and an electronic control unit using a neural network for analyzing sensor data of the at least one sensor and providing perception tasks for the vehicle based on the analyzed sensor data, wherein the sensor data comprises one or more of optical, acoustical, and electromagnetic data, the method comprising:
providing a data set of the sensor data by the at least one sensor in a spatial domain;
transforming the data set of the sensor data by the electronic control unit using frequency analysis into a frequency spectrum in a frequency domain; and
analyzing the frequency spectrum of the data set in order to detect an adversarially attacked data set; wherein
wherein in response to an adversarially attacked data set being detected from analyzing the frequency spectrum, at least the following is conducted: selectively activating a security mechanism against an adversarial attack;
wherein the security mechanism comprises one or more of:
activating a pre-processing technique to remove adversarial attack from the data set;
using a denoising filter for cleaning the adversarially attacked data set;

using a hardened neural network for analyzing the adversarially attacked data set;
using multiple other neural networks with different architectures in an ensemble and performing a consolidation of their output for analyzing the adversarially attacked data set;
applying rule-based technique for analyzing the adversarially attacked data set, especially using external, human-readable devices; and
requesting a user of the vehicle for analyzing the adversarially attacked data set; and
wherein the neural network or a special detecting neural network used for detecting the adversarially attacked data set are trained in the frequency domain on frequency spectrums of clean data sets and on frequency spectrums of prepared adversarially attacked data sets in order to learn differences between the frequency spectrums of the clean data sets and the frequency spectrums of the adversarially attacked data sets in the frequency domain.

2. The method of claim 1, wherein providing the data set of the sensor data by the sensor in the spatial domain, transforming the data set of the sensor data by the electronic control unit using frequency analysis into the frequency spectrum in the frequency domain, and analyzing the frequency spectrum of the data set in order to detect the adversarially attacked data set are executed before analyzing the sensor data for providing perception tasks for the vehicle.

3. The method of claim 1, wherein the sensor data comprise camera, lidar, and/or radar data.

4. The method of claim 1, wherein the frequency analysis is provided by one or more of a discrete Fourier transformation (DFT), a discrete cosine transformation, and Wavelet transformation.

5. The method of claim 1, wherein for detecting the adversarially attacked data set, the neural network is used, which is also used for analyzing the sensor data of the sensor and for providing perception tasks for the vehicle.

6. The method of claim 1, wherein for detecting the adversarially attacked data set, a denoising filter is used for denoising the frequency spectrum of the data set in the frequency domain; wherein the denoising filter is built in the frequency domain using frequency spectrums of clean data sets and noise spectrums of prepared adversarially attacked data sets.

7. The method of claim 1, wherein for detecting the adversarially attacked data set, the frequency spectrum of the data set are compared with a denoised frequency spectrum; wherein a threshold is applied by comparing the frequency spectrum of the data set with the denoised frequency spectrum; wherein the attacked data sets will be detected in response to a difference between the frequency spectrum of the data set and the denoised frequency spectrum is greater than the applied threshold.

8. The method of claim 1, wherein when an adversarially attacked data set is detected, at least the following conducted: initiating an emergency maneuver.

9. The method of claim 8, wherein the emergency maneuver comprises one or more of: reducing vehicle speed, initiating an emergency stop, providing an alarm inside and/or outside of the vehicle, activating a manual driving mode, and deactivate the driver assistance system.

10. An electronic control unit, comprising:
a memory, in which a program code is stored; and
a processor, wherein when executing the program code by the processor, the processor is configured to at least:
provide a data set of sensor data in a spatial domain, wherein the sensor data comprises one or more of optical, acoustical, and electromagnetic data;
transform the data set of the sensor data using frequency analysis into a frequency spectrum in a frequency domain; and
analyze the frequency spectrum of the data set in order to detect an adversarially attacked data set; wherein
wherein in response to an adversarially attacked data set being detected from analyzing the frequency spectrum, at least the following is conducted: selectively activating a security mechanism against an adversarial attack;
wherein the security mechanism comprises one or more of:
activating a pre-processing technique to remove adversarial attack from the data set;
using a denoising filter for cleaning the adversarially attacked data set;
using a hardened neural network for analyzing the adversarially attacked data set;
using multiple other neural networks with different architectures in an ensemble and performing a consolidation of their output for analyzing the adversarially attacked data set;
applying rule-based technique for analyzing the adversarially attacked data set, especially using external, human-readable devices; and
requesting a user of the vehicle for analyzing the adversarially attacked data set; and
wherein the neural network and/or a special detecting neural network used for detecting the adversarially attacked data set are trained in the frequency domain on frequency spectrums of clean data sets and on frequency spectrums of prepared adversarially attacked data sets in order to learn differences between the frequency spectrums of the clean data sets and the frequency spectrums of the adversarially attacked data sets in the frequency domain.

11. A vehicle comprising an electronic control unit, the electronic control unit comprising:
a memory, in which a program code is stored; and
a processor, wherein when executing the program code by the processor, the processor is configured to at least:
provide a data set of sensor data in a spatial domain, wherein the sensor data comprises one or more of optical, acoustical, and electromagnetic data;
transform the data set of the sensor data using frequency analysis into a frequency spectrum in a frequency domain; and
analyze the frequency spectrum of the data set in order to detect an adversarially attacked data set; wherein
wherein in response to an adversarially attacked data set being detected from analyzing the frequency spectrum, at least the following is conducted: selectively activating a security mechanism against an adversarial attack;
wherein the security mechanism comprises one or more of:
activating a pre-processing technique to remove adversarial attack from the data set;
using a denoising filter for cleaning the adversarially attacked data set;
using a hardened neural network for analyzing the adversarially attacked data set;
using multiple other neural networks with different architectures in an ensemble and performing a consolidation of their output for analyzing the adversarially attacked data set;

applying rule-based technique for analyzing the adversarially attacked data set, especially using external, human-readable devices; and requesting a user of the vehicle for analyzing the adversarially attacked data set; and wherein the neural network or a special detecting neural network used for detecting the adversarially attacked data set are trained in the frequency domain on frequency spectrums of clean data sets and on frequency spectrums of prepared adversarially attacked data sets in order to learn differences between the frequency spectrums of the clean data sets and the frequency spectrums of the adversarially attacked data sets in the frequency domain.

12. A non-transitory storage medium comprising instructions for a processor, which instructions, when executed by the processor, cause the processor to:

provide a data set of the sensor data by the sensor in a spatial domain, wherein the sensor data comprises one or more of optical, acoustical, and electromagnetic data;

transform the data set of the sensor data by the electronic control unit using frequency analysis into a frequency spectrum in a frequency domain; and analyze the frequency spectrum of the data set in order to detect an adversarially attacked data set; wherein wherein in response to an adversarially attacked data set being detected from analyzing the frequency spectrum, at least the following is conducted: selectively activating a security mechanism against an adversarial attack;

wherein the security mechanism comprises one or more of:

activating a pre-processing technique to remove adversarial attack from the data set;

using a denoising filter for cleaning the adversarially attacked data set;

using a hardened neural network for analyzing the adversarially attacked data set;

using multiple other neural networks with different architectures in an ensemble and performing a consolidation of their output for analyzing the adversarially attacked data set;

applying rule-based technique for analyzing the adversarially attacked data set, especially using external, human-readable devices; and requesting a user of the vehicle for analyzing the adversarially attacked data set; and wherein the neural network or a special detecting neural network used for detecting the adversarially attacked data set are trained in the frequency domain on frequency spectrums of clean data sets and on frequency spectrums of prepared adversarially attacked data sets in order to learn differences between the frequency spectrums of the clean data sets and the frequency spectrums of the adversarially attacked data sets in the frequency domain.

13. The method of claim 1, wherein providing the data set of the sensor data by the sensor in the spatial domain, transforming the data set of the sensor data by the electronic control unit using frequency analysis into the frequency spectrum in the frequency domain, and analyzing the frequency spectrum of the data set in order to detect the adversarially attacked data set are executed periodically.

14. The method of claim 1, wherein providing the data set of the sensor data by the sensor in the spatial domain, transforming the data set of the sensor data by the electronic control unit using frequency analysis into the frequency spectrum in the frequency domain, and analyzing the frequency spectrum of the data set in order to detect the adversarially attacked data set are executed for each data set of the sensor data during operation of the vehicle.

15. The method of claim 1, wherein the data set is provided as a picture of the environment of the vehicle.

16. The method of claim 1, wherein the electronic control unit uses a deep neural network as the neural network for analyzing the sensor data of the sensor and for providing perception tasks for the vehicle based on the analyzed sensor data.

17. The method of claim 1, wherein for detecting the adversarially attacked data set, a special detecting neural network is used.

* * * * *